Figure 1:
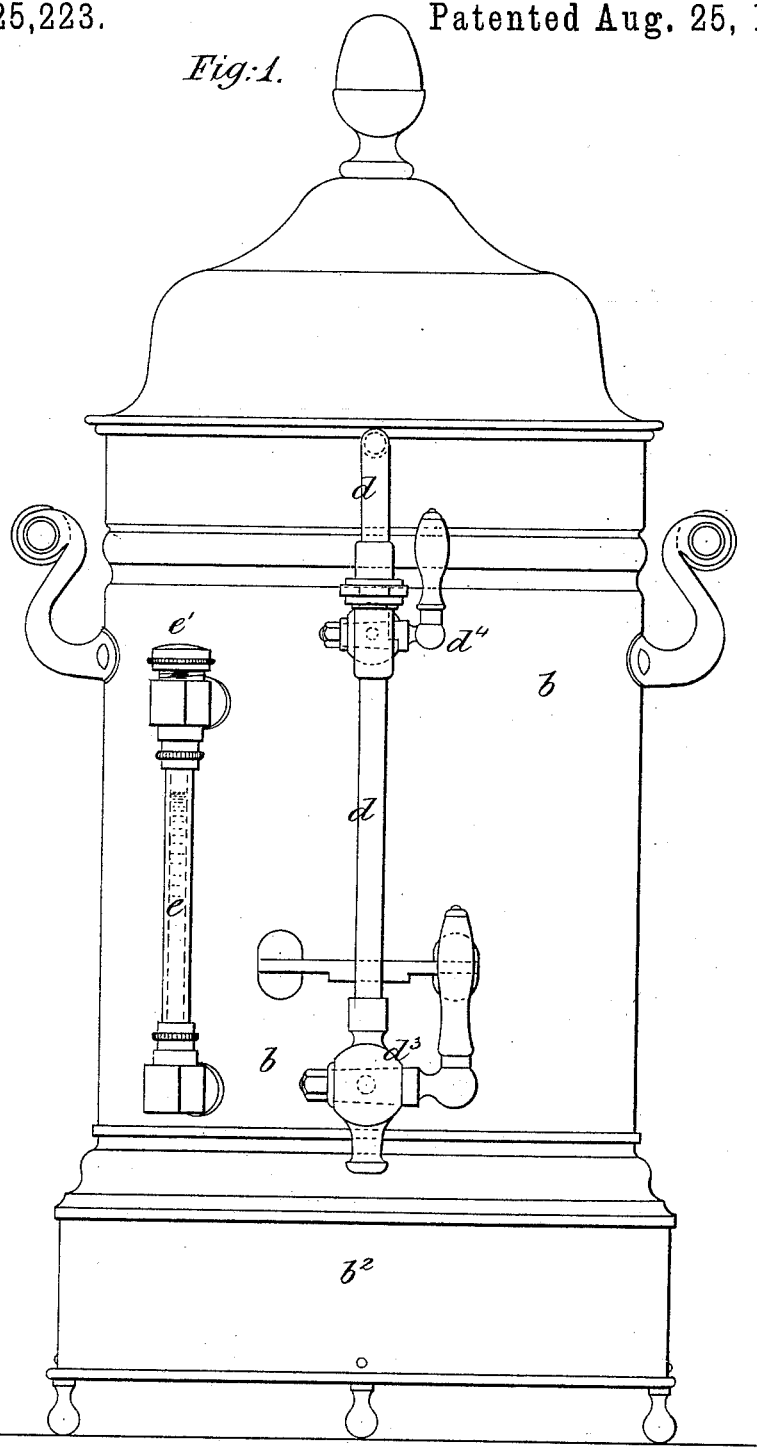

(No Model.) 2 Sheets—Sheet 1.

E. BOYES.
COFFEE OR TEA POT.

No. 325,223. Patented Aug. 25, 1885.

Witnesses
Victor A. Lewis
Geo. L. Wheelock

Inventor
Ebenezer Boyes
By Knight Bros
his Atty

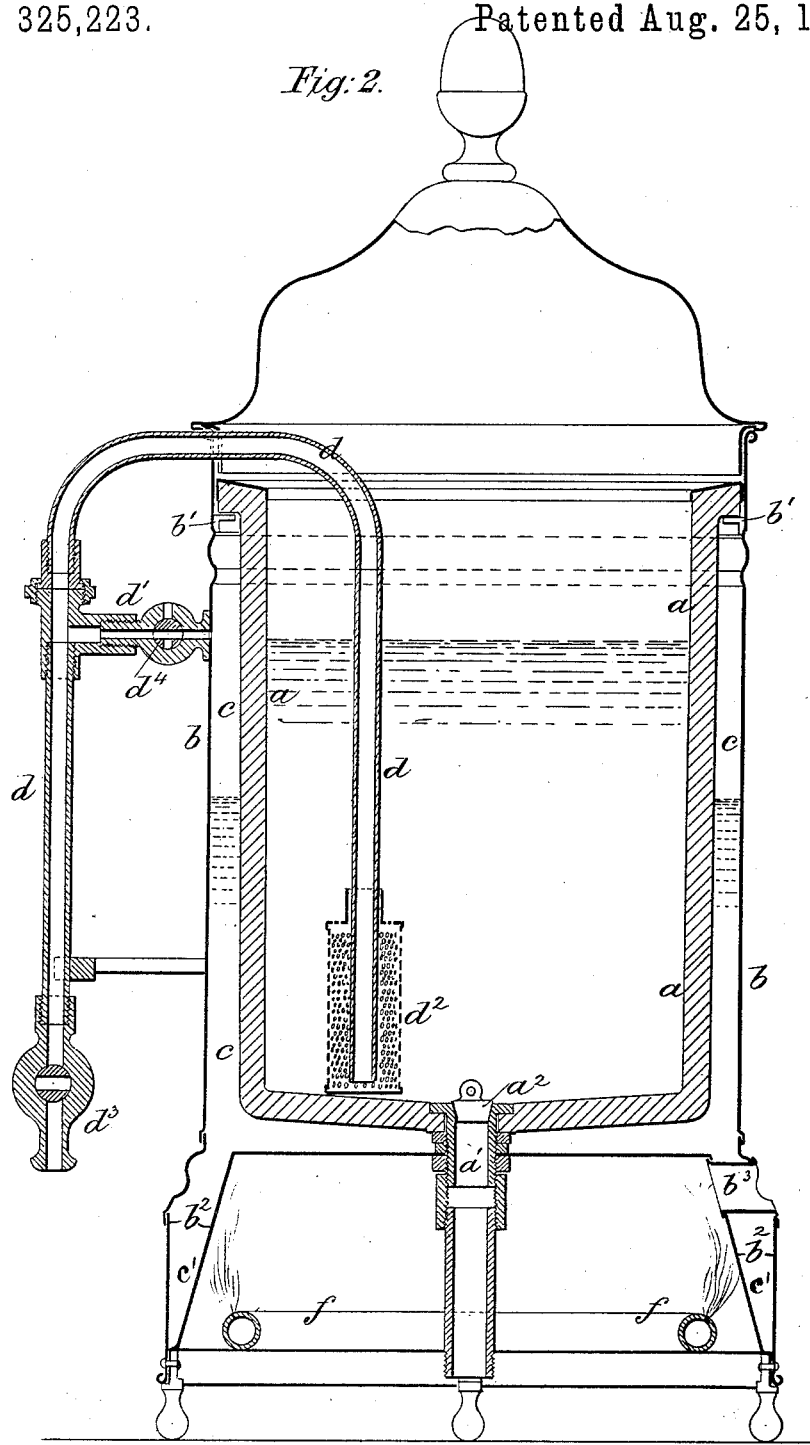

UNITED STATES PATENT OFFICE.

EBENEZER BOYES, OF PECKHAM, COUNTY OF SURREY, ENGLAND.

COFFEE OR TEA POT.

SPECIFICATION forming part of Letters Patent No. 325,223, dated August 25, 1885.

Application filed February 14, 1885. (No model.) Patented in England July 6, 1883, No. 3,363, and January 1, 1884, No. 215.

*To all whom it may concern:*

Be it known that I, EBENEZER BOYES, a subject of the Queen of Great Britain, residing at Albert Road, Peckham, in the county of Surrey, England, coffee-dealer, have invented certain new and useful Improvements in Coffee and Tea Pots, (for which I have received Letters Patent in Great Britain, No. 3,363, dated July 6, 1883, and No. 215, dated January 1, 1884,) of which the following is a specification.

The invention has for its object improvements in coffee and tea pots. For this purpose I employ a metal vessel to contain water, into which I sink a vessel, made preferably of earthenware and of any convenient form, so as to leave a space between them. The upper part of the inner vessel is supported on a ledge in the outer vessel, and is cemented thereon, or is otherwise secured to the outer vessel. To the upper part of the outer vessel, above the level of the water therein, I cement a tubular junction provided with a cock or valve with multiple channels, and to this tubular junction I connect a pipe, $d$, in the form of a siphon, one leg of which enters the inner vessel from above, and terminates in a strainer at or near the bottom of such inner vessel. The longer leg of the siphon is provided with a tap or valve at the lower end thereof. The cock or valve on the tubular junction is so arranged that when in one position, and the tap on the bottom of the outer leg of the siphon is closed, steam is caused to pass from the outer vessel through the siphon into the inner vessel, so as to boil the contents thereof; then when such boiling is completed the multiple-wayed cock or valve is turned, so as to shut off communication between the outer vessel and the siphon, and at the same time open a communication between the interior of the outer vessel and the outer air; then on the cooling of the steam in the outer leg of the siphon a vacuum will be created therein, which will draw the coffee or tea over into the same; then when the said outer leg is full of coffee or tea the tap or valve at the lower end thereof is opened and the contents of the inner vessel drawn off either at once or from time to time, as may be required. I also, according to my present invention, form the bottom of the inner vessel of conical, tapered, or other reduced form and connect to the same a pipe, which I pass down through the outer vessel, a plug or tap being employed to open or close the passage through the said pipe. By these means I am enabled, when required, to cleanse the inner vessel and to run off the contents thereof when the siphon is not in action. I provide the outer vessel with a gage-glass, the upper end of which I provide with a screw-stopper, thereby enabling such gage-glass to be used also as a filling-tube.

In order that my said invention may be more clearly understood and readily carried into effect, I will proceed, aided by the accompanying drawings, more fully to describe the same.

In the drawings, Figure 1 is an elevation, and Fig. 2 is a vertical section, of a coffee or tea pot constructed according to my invention.

$a$ is the inner vessel, which is supported on a ledge, $b'$, in the outer vessel, $b$, and hermetically fixed, so as to form a close chamber, $c$, between them.

$d$ is a pipe which through the tubular junction $d'$ communicates with the upper part of the close chamber $c$, and when required admits steam therefrom into the water contained in the vessel $a$. This tube $d$, as shown in the drawings, has the form of a siphon, one leg of which enters the inner vessel, $a$, from above, and terminates in a strainer, $d^2$, at or near the bottom of such inner vessel. The outer and longer leg of the siphon $d$ is provided with a tap or valve, $d^3$, at the lower end thereof, and the tubular junction $d'$ is provided with a cock or valve, $d^4$, which is formed with multiple channels, in such manner that when the plug of such tap or valve $d^4$ is in the position shown in the drawings steam can pass from the close chamber $c$ into the pipe $d$, whence it passes into the water in the inner vessel, $a$, but when such plug is turned a quarter round the pipe $d$ is cut off from the steam in the close chamber $c$, and the steam from such chamber $c$ finds a free vent into the open air.

$e$ is a gage-glass which indicates the level of water in the chamber $c$, and $e'$ is a screw-nozzle at the top of such gage-glass $e$, to enable the supply of water to the chamber $c$ to be poured in through the gage-glass $e$, and then to hermetically close such nozzle. The bottom of the inner vessel, $a$, is inclined toward the center, and a pipe, $a'$, connected thereto passes down through the outer vessel, $b$, a plug, $a^2$, or it may be a tap, being employed to open or close the passage through such pipe $a'$. I prefer to form the bottom of the outer vessel, $b$, with an annular hollow continuation, $b^2$, forming an extension, $c'$, to the chamber $c$, as shown, so that it can be placed over and inclose a gas-burner, $f$, or over a stove or other heating means, a flue or passage, $b^3$, being formed through the upper part of such annular continuation $b^2$, for the escape of the products of combustion.

The coffee or tea pot is used in the following manner: The required quantity of water is placed in the inner vessel, $a$, and water is supplied to the chamber $c$ through the gage-glass $e$ until it rises to about the level indicated. Such last-mentioned water is then boiled. The taps or valves are placed in the position shown in the drawings, when steam from the chamber $c$ will pass into the pipe $d$, and thence into the water in the inner vessel, $a$, and boil the same. When the water in the inner vessel, $a$, has reached the boiling-point, the tap or valve $d^4$ is turned so as to shut off the steam from the pipe $d$ and enable the steam in the chamber $c$ to escape into the open air, and the tea or coffee is then introduced into such vessel $a$. When brewing coffee, and after the introduction of the ground coffee into the inner vessel, $a$, the steam may, if desired, again be turned into such vessel and the boiling continued as long as may be considered requisite, after which the steam may again be allowed to escape into the open air, as above described. On the cooling of the steam in the outer leg of the pipe or siphon $d$ a vacuum will be created therein, which will draw the coffee or tea over into the same; then when the said outer leg is full of coffee or tea the tap or valve $d^3$ is opened and the contents drawn off either at once or from time to time, as may be required.

As a modification of the above, the outer leg of the pipe or siphon $d$ below the tubular connection $d'$, as also the central discharge-pipe $a'$, may be dispensed with, in which case the contents of the inner vessel, $a$, will be poured out from the top thereof.

Having now particularly described and ascertained the nature of my said invention and in what manner the same is to be performed, I declare that what I claim is—

1. The combination of inner vessel, $a$, and outer vessel, $b$, hermetically connected together at the upper end, forming the close chamber $c$, pipe $d$, tubular junction $d'$, and valve $d^4$, substantially as herein shown and described, and for the purpose stated.

2. The combination of inner vessel, $a$, outer vessel, $b$, forming the close chamber $c$, pipe $d$, tubular connection $d'$, and valves $d^3$ $d^4$, substantially as herein shown and described, and for the purpose stated.

3. The combination of inner vessel, $a$, outer vessel, $b$, forming the close chamber $c$, pipe $d$, and valve $d^3$, substantially as herein shown and described, and for the purpose stated.

E. BOYES.

Witnesses:
    JOHN STRAND,
*Solicitor's Clerk, 9 Gracechurch Street, London.*
    JOHN D. VENN,
*Notary's Clerk, 9 Gracechurch Street, London.*